(12) United States Patent
DuHack et al.

(10) Patent No.: US 7,222,642 B2
(45) Date of Patent: May 29, 2007

(54) ENHANCED WATER VALVE TUBE STOP

(75) Inventors: Michael DuHack, Indianapolis, IN (US); Kelly S. Gagne, Saint Charles, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/260,733

(22) Filed: Oct. 27, 2005

(65) Prior Publication Data
US 2007/0095412 A1    May 3, 2007

(51) Int. Cl.
*F16K 11/10* (2006.01)
(52) U.S. Cl. .................................. 137/883; 251/118
(58) Field of Classification Search ................ 137/883; 251/118, 121, 122; 138/45
See application file for complete search history.

(56) References Cited

U.S. PATENT DOCUMENTS

| | | | |
|---|---|---|---|
| 4,697,608 A | 10/1987 | Kolze et al. | |
| 4,768,559 A * | 9/1988 | Hehl | 137/887 |
| 5,253,842 A | 10/1993 | Huebscher et al. | |
| 5,340,080 A * | 8/1994 | Cleland | 251/120 |
| 5,400,744 A | 3/1995 | Coiro, Sr. et al. | |
| 5,468,027 A * | 11/1995 | Guest | 285/319 |
| 5,810,331 A | 9/1998 | Smock et al. | |
| 5,813,652 A | 9/1998 | Richmond et al. | |
| 5,855,355 A * | 1/1999 | Grunert et al. | 251/120 |
| 5,899,224 A | 5/1999 | Moldenhauer | |
| 5,921,275 A | 7/1999 | Knop et al. | |
| 5,964,447 A | 10/1999 | DuHack et al. | |
| 6,070,606 A | 6/2000 | Swanson et al. | |
| 6,076,801 A | 6/2000 | DuHack et al. | |
| 6,213,149 B1 * | 4/2001 | Moner | 137/556.3 |
| 6,378,542 B1 | 4/2002 | DuHack | |
| 6,412,645 B1 | 7/2002 | DuHack | |
| 6,422,258 B1 | 7/2002 | DuHack et al. | |
| 6,460,367 B1 | 10/2002 | DuHack | |
| 6,532,758 B2 | 3/2003 | DuHack | |
| 6,615,858 B2 | 9/2003 | DuHack et al. | |
| 6,684,906 B2 | 2/2004 | Burns et al. | |
| 7,082,957 B2 * | 8/2006 | Guest | 137/68.19 |

* cited by examiner

*Primary Examiner*—John Fox
(74) *Attorney, Agent, or Firm*—Harness, Dickey & Pierce, PLC

(57) ABSTRACT

A fluid valve assembly and method for assembling the same includes a valve body defining an inlet, an outlet and a fluid passage communicating fluid therebetween. A control member is positioned within the fluid passage and includes a central passage through which the fluid advances. A flow seat component is positioned in the valve body downstream of the flow control member and receives the fluid from the flow control member. A cap component is secured to a distal opening defined on the valve body. A quick-connect collet is retained within an opening defined on the cap component.

12 Claims, 4 Drawing Sheets

ENHANCED WATER VALVE TUBE STOP

FIELD OF THE INVENTION

The present invention relates generally to water valves and, more particularly, to water valves incorporating a quick connect feature and used in household appliances such as dishwashers, icemakers and clothes washing machines.

BACKGROUND OF THE INVENTION

In recent years there has been an increasing desire to provide a water dispenser and automatic ice maker on a household refrigerator. In such an arrangement a valve assembly is typically provided having a single water inlet and a pair of water outlets. The valve assembly may have a pair of valves housed in the valve assembly, one dedicated to controlling flow to the ice maker and the other dedicated to controlling flow to the water dispenser. Typically, the refrigerator includes a first water supply line that is adapted to connect from one of the water outlets on the valve assembly to the ice maker. A second water supply line is similarly adapted to connect from the other water outlet on the valve assembly to the water dispenser.

In one arrangement, the water supply lines and the respective water outlets on the valve assembly are attached by way of a quick connect. A quick connect allows the supply lines to be easily connected to the water outlets without the requirement of fasteners or supplemental hand tools. In general, to couple a supply line to a water outlet on the valve assembly, an end of the supply line is simply inserted into a tube gripper or collet provided on the water outlet. Once inserted, the collet provides radial retention on a first portion of the supply line to maintain a connection. In some instances an o-ring may also be provided to encourage a water tight fit. If the supply line needs to be removed from the quick connect, an outer flange defined on the supply line is squeezed thereby reducing the radial retention force between the collet and the supply line and therefore allowing the supply line to be retracted from the collet interface.

While the quick connect feature provides the convenience of a simple connection, quick connects can be difficult to manufacture within the valve assembly. For example, current designs for quick connect water valves with dual flow controls incorporated in the outlets of the valve require two weld operations to install the quick connect geometry for each valve outlet. As a result, such a valve assembly requires four weld operations. Consequently, it is desirable to provide a valve configuration having a quick connect feature that is simpler and more cost effective to manufacture.

SUMMARY OF THE INVENTION

A fluid valve assembly includes a valve body defining an inlet, an outlet and a fluid passage communicating fluid therebetween. A control member is positioned within the fluid passage and includes a central passage through which the fluid advances. A flow seat component is positioned in the valve body downstream of the flow control member and receives the fluid from the flow control member. A cap component is secured to a distal opening defined on the valve body. A quick-connect collet is retained within an opening defined on the cap component.

According to other features, the valve assembly further includes an o-ring supported within the cap component. The o-ring is adapted to seat on an outlet defined on the flow seat component. The flow seat component defines an upstream cup supporting the flow control member. The flow seat component also defines a downstream cup having an intermediate portion and an annular collar radially stepped in from the intermediate portion.

A method of manufacturing a fluid valve includes slideably inserting a flow seat component within a valve body. The flow seat component captures a flow control member within the valve body. A cap component is positioned at a downstream opening defined on the valve body. The cap component is then welded to the valve body. The cap component captures the flow seat component within the valve body. The cap component captures a quick-connect collet arranged on a downstream opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
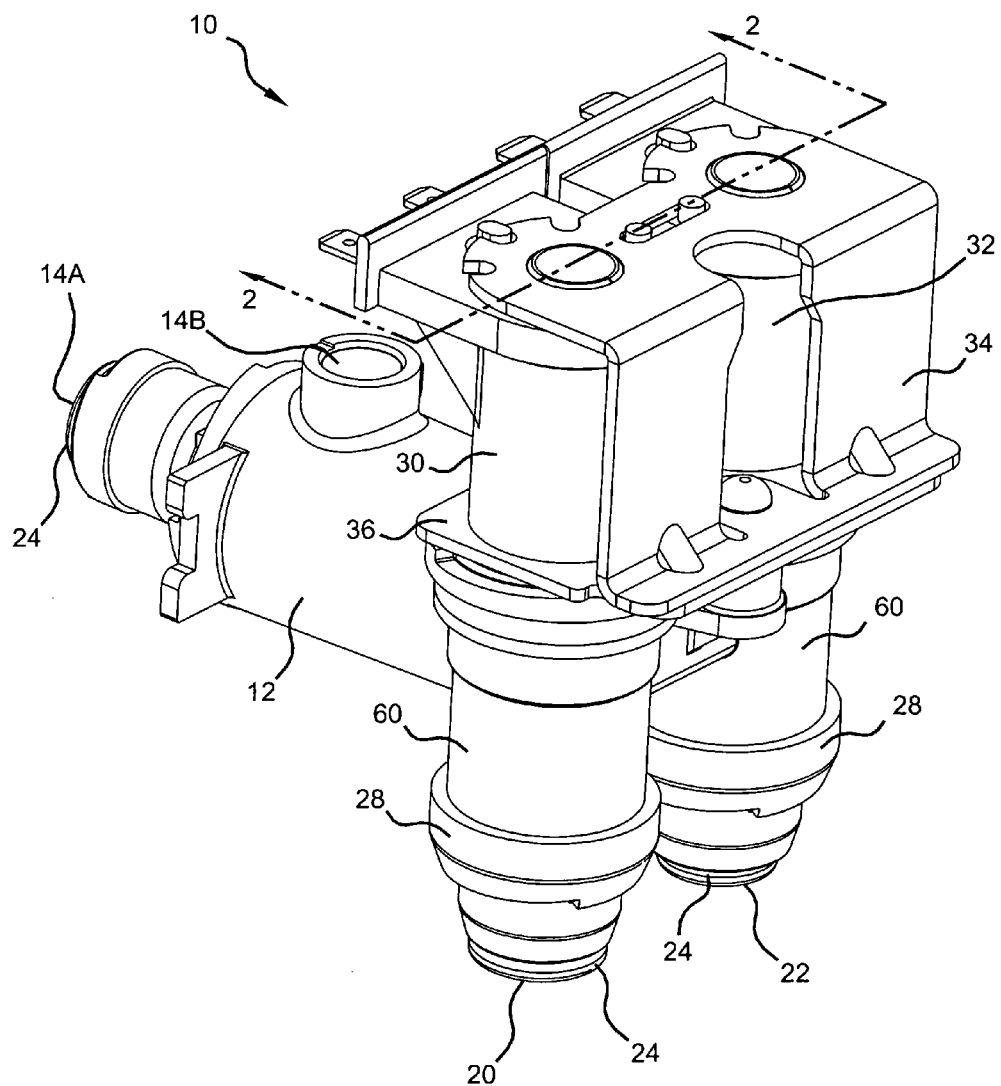
FIG. 1 is a front perspective view of a water valve constructed in accordance with the teachings of the present invention.
Figure 2:
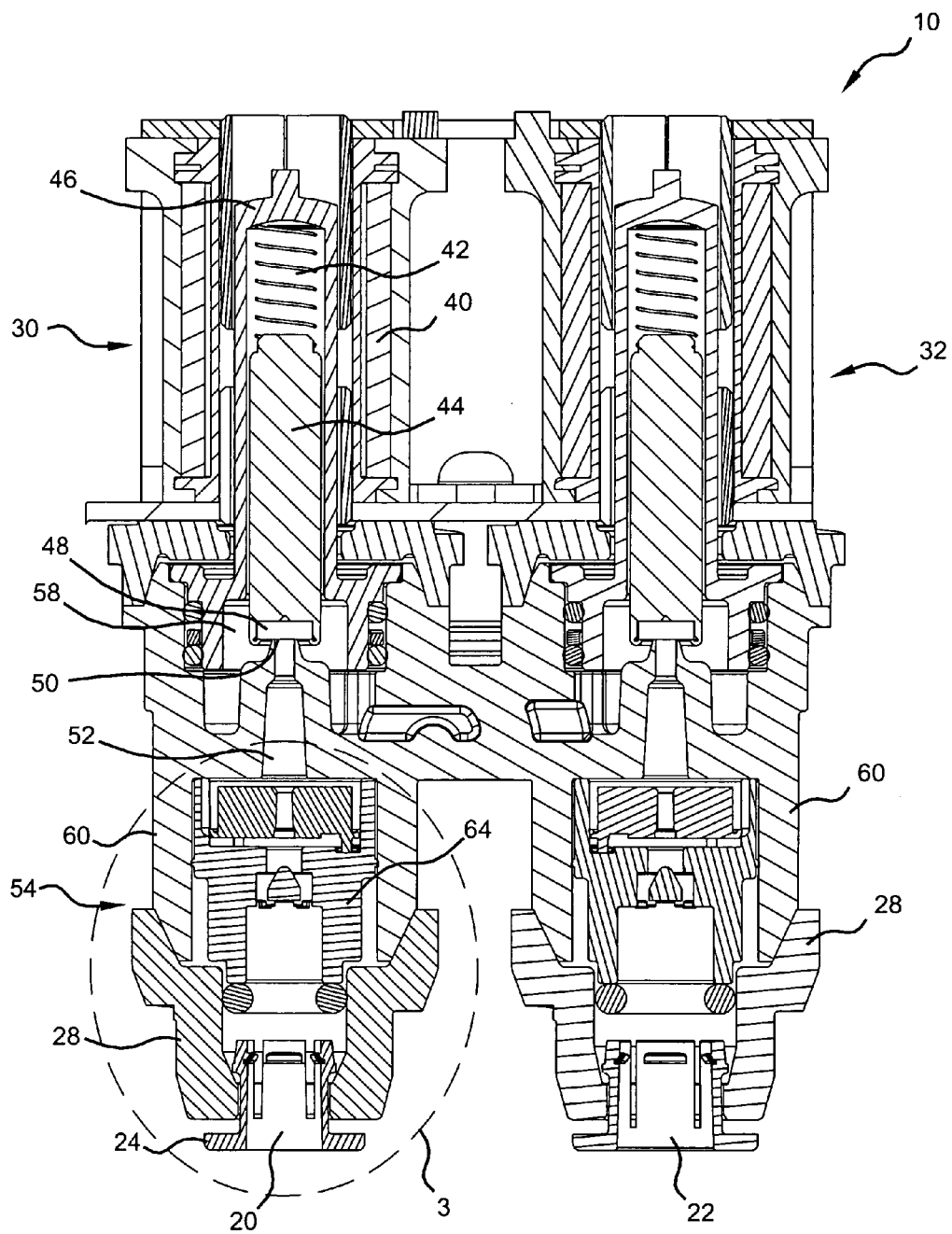
FIG. 2 is a cross-sectional view of the water valve shown in FIG. 1 taken along line 2-2.

Referring now to FIGS. 1 and 2, there is shown an appliance water valve assembly 10. The water valve assembly 10 includes a valve body 12, a water inlet 14A and a pair of water outlets 20 and 22. During operation of the valve assembly 10, water is selectively advanced from the water inlet 14A, through the valve body 12, and out the desired water outlet 20 and/or 22. Alternatively, a water inlet 14B may be used.

The exemplary valve assembly 10 shown in the drawings is particularly useful for supplying water to two separate appliance components such as an icemaker and a door-mounted cold water dispensing unit. It should be appreciated however, that the concepts of the present invention may also be utilized in the construction of water valve assemblies having a single outlet and/or water valve assemblies for use in other types of appliances such as dishwashers and clothes washers or even in the construction of water valve assemblies for non-appliance applications.

The water inlet 14A is typically connected to a residential water line (not shown) thereby providing for a water flow to the valve assembly 10. The inlet 14A and the outlets 20 and 22 may be of the quick connect variety. Specifically, the inlet 14A and the outlets 20 and 22 include a tube gripper or collet 24 annularly retained by an inlet cap component 14A and outlet cap component 28 (as best illustrated in FIGS. 1 and 2). The quick connect inlet 14A and outlets 20 and 22 facilitate connection of an appliance water line (not shown) for delivering water to the desired appliance component.

The water valve assembly 10 further includes a pair of valve actuator assemblies 30 and 32 having an upper plate frame 34 and a lower plate frame 36. For purposes of discussion, the operation and features associated with the actuator assembly 30 and outlet 20 of the valve assembly 10 will be described in greater detail. It is appreciated however, that the actuator assembly 32 and outlet 22 are similarly constructed and provide similar operation.

With specific reference now to FIG. 2, the water valve assembly 10 will be further described. The water valve assembly 10 generally includes field windings 40, a biasing spring 42, a solenoid armature 44, a guide tube 46, a valve seal 48, a valve surface 50, an outlet extension 52 and a valve body outlet assembly 54. The valve seal 48 is retained in the solenoid armature 44. The solenoid armature 44 is slideably carried in the guide tube 46 and is moveable to an open position away from the valve surface 50 for permitting water flow from an actuation chamber 58 to the valve outlet 20 and moveable to a closed position contacting the valve surface 50 for preventing water flow from the actuation chamber 58 to the valve outlet 20.

When the field windings 40 are energized, the solenoid armature 44 is retracted to lift the valve seal 48 thereby permitting flow of water from the actuation chamber 58 into the valve body outlet assembly 54, out the outlet 20 and into the water line of the appliance (not shown). When the field windings 40 are de-energized, the solenoid armature 44 is returned to the closed position by the biasing spring 42 and the valve seal 48 contacts the valve surface 50 thereby stopping the flow of water from the actuation chamber 58 into the valve body outlet assembly 54.

Figure 3:
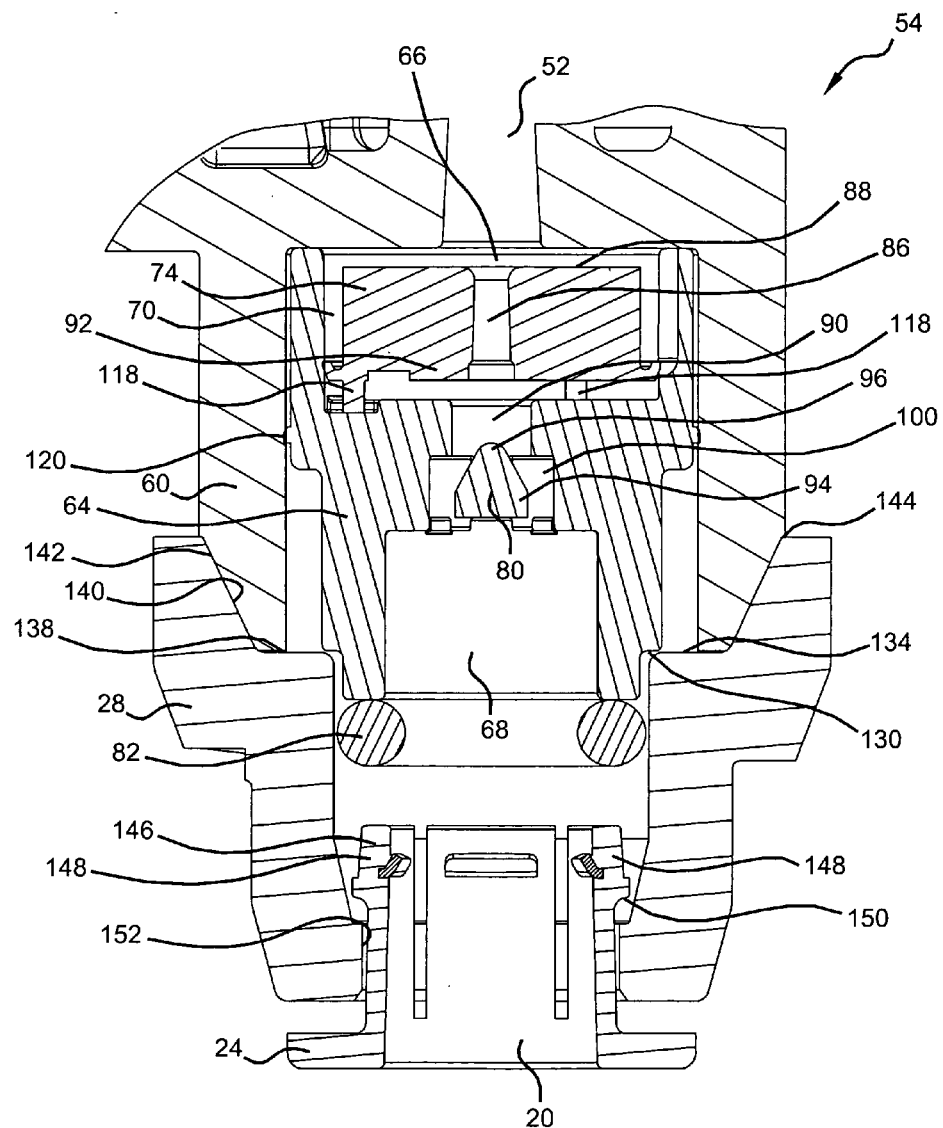
FIG. 3 is an enlarged detail of the cross-sectional view of the water valve of FIG. 2 showing a valve body outlet assembly.

With continued reference to FIGS. 1 and 2 and further reference to FIG. 3, the valve body outlet assembly 54 will now be described in greater detail. The valve body outlet assembly 54 generally includes a valve body outlet 60, a flow seat component 64, the cap component 28 and the collet 24. The flow seat component 64 defines an inlet 66, an outlet 68 and a flow control chamber 70 for accepting water from the outlet extension 52. The flow control chamber 70 is disposed within the valve body outlet 60 and retains a flow control member 74 and a noise reduction member or bullet 80. The bullet 80 can be integral with the flow seat component 64 as illustrated in FIG. 3 or can be a separate piece. An o-ring 82 is supported within the cap component 28 and is adapted to seat on the flow seat component 64 at the outlet 68.

The flow control member 74 is made of flexible material such as ethylene propylene (EP) rubber, and has a central passage 86 defined therein. The flow control member 74 flexes or deforms in response to variations in inlet water pressure exerted on an upstream surface 88. In particular, a higher inlet water pressure on the upstream surface 88 causes a greater amount of flexing or deformity of the flow control member 74, thereby reducing the diameter of the central passage 86. A lower inlet water pressure exerted on the upstream surface 88, causes the flexing or deformity of the flow control member 74 to be reduced, thereby increasing the diameter of the central passage 86.

The flow seat component 64 has an orifice 90 defined therein, and provides a surface 92 on which the flow control member 74 is supported. The bullet 80 reduces the amount of cavitation, and hence the amount of noise, generated by the flow of water being advanced through the valve assembly 10. The bullet 80, may be made of a plastic material such as polypropylene. The bullet 80 includes a bullet body 94 and a tip 96. The bullet 80 extends toward orifice 90 of the flow seat component 64 and is centrally aligned in a central passage 100 of the flow seat component 64. Since the bullet 80 is aligned with the central passage 100, a direct flow path or line of advancement of the flow of water exists.

Figure 4:
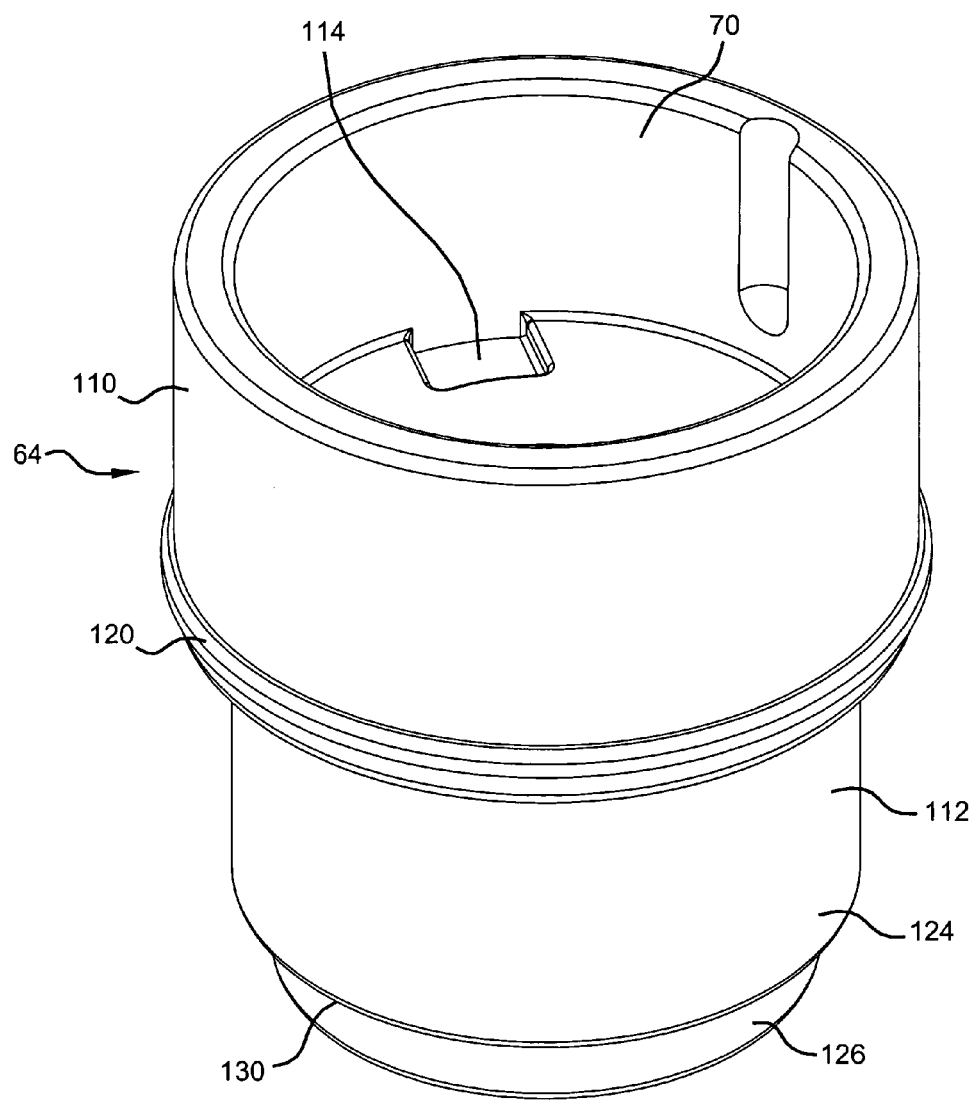
FIG. 4 is a perspective view of a flow seat component for the water valve of FIG. 1.

With continued reference to FIGS. 1-3, and further reference to FIG. 4, the flow seat component 64 will be described in greater detail. The flow seat component 64 generally includes an upstream cup portion 110, defining the flow control chamber 70, and a downstream cup portion 112. The upstream cup portion 110 defines a series of recesses 114 for locating a series of fingers 118 of the flow control member 74. In the exemplary configuration, three recesses 114 are formed for locating three fingers 118. A radial rib 120 extends around a downstream portion of the upstream cup 110. The radial rib 120 facilitates a press-fit or interference fit with an inner diameter (FIG. 3) of the valve body outlet 60. The downstream cup portion 112 defines an intermediate portion 124 and an annular collar 126. The annular collar 126 is adapted to engage the o-ring 82 in an assembled position (FIG. 3). The annular collar 126 is radially stepped in from the intermediate portion 124 and defines a radial ledge 130. During operation, the radial ledge 130 of the flow seat component 64 is supported by an annular shoulder 134 defined by the cap component 28 (FIG. 3).

Assembly of the valve body outlet assembly 54 will now be described. At the outset, the flow control member 74 is positioned into the flow control chamber 70 of the flow seat component 64. The flow seat component 64 is then slideably inserted within the inner diameter of the valve body outlet 60 thus creating a press-fit at the radial rib interface 120. Next, the cap component 28 is positioned against a downstream opening 138 on the valve body outlet 60 capturing the flow seat component 64 and the flow control member 74 therebetween. Next, the cap component 28 is connected, such as by a welding operation to the valve body outlet 60. More specifically, a weld is created at an interface between a tapered female surface 140 of the cap component 28 and a tapered male surface 142 of the valve body outlet 60.

According to the teachings of the present invention, only a single welding operation between the mating surfaces (140 and 142) of the valve body outlet 60 and the cap component 28 is necessary to manufacture (assemble) the valve outlet assembly 54.

The valve body outlet 60 and the cap component 28 are fused together at the mating surfaces (140 and 142) in a welding operation. The welding operation serves to permanently affix the cap component 28 and the valve body 60.

The welding operation may be, for example, a friction welding operation such as spin welding. Friction welding generally is a process for joining components in which sufficient heat for the melting and fusion of the components is generated by friction between the components. In this process, one of the members is held stationary while the other is rotated at a high speed. The members are then brought into contact under an axial force. The friction induced at the interface between the components produces heat so that the components (in the present invention, the cap component 28 and the valve body outlet 60) are melted and fused together.

Once the weld has been created, the o-ring may be slidably inserted into the outlet assembly 54. The collet 24 may be squeezed at an upper end 146 defining a plurality of fingers 148 and slideably inserted (in an upward direction as viewed from FIG. 3) into the cap component 28. Once a radial ledge 150 defined around the upper end 146 of the collet 24 clears an inner diameter 152 of the cap component 28, the upper end 146 of the collet 24 rebounds outwardly to a relaxed position (FIG. 3). Once assembled, the radial ledge 150 limits downward motion of the collet 24 within the cap component 28.

The configuration of the valve body outlet assembly 54 and the single welding operation described herein provides a cost effective method for manufacturing quantities of valves.

Those skilled in the art can now appreciate from the foregoing description that the broad teachings of the present invention can be implemented in a variety of forms. Therefore, while this invention has been described in connection with particular examples thereof, the true scope of the invention should not be so limited since other modification will become apparent to the skilled practitioner upon a study of the drawings, specification and following claims.

What is claimed is:

1. A fluid valve assembly, comprising:
    a valve body defining an inlet, an outlet and a fluid passage communicating fluid therebetween;
    a flow control member positioned within said fluid passage and having a central passage through which said fluid advances;
    a flow seat component positioned in said valve body downstream of said flow control member and receiving said fluid from said flow control member;
    a cap component secured to a distal opening defined on said valve body; and
    a quick-connect collet retained within an opening defined on said cap component.

2. The fluid valve assembly of claim 1, further comprising an o-ring supported within said cap component and adapted to seat on an outlet defined on said flow seat component.

3. The fluid valve assembly of claim 1 wherein said flow seat component defines an upstream cup supporting said flow control member therein.

4. The fluid valve assembly of claim 3 wherein said upstream cup defines a radial rib on an outer surface, said radial rib facilitating a press-fit between said flow seat component and said valve body.

5. The fluid valve assembly of claim 4 wherein said flow seat component defines a downstream cup having an intermediate portion and an annular collar radially stepped in from said intermediate portion.

6. The fluid valve assembly of claim 5 wherein said flow seat component defines a noise reduction member, said noise reduction member adapted to reduce cavitation generated by water flow through said valve body.

7. The fluid valve assembly of claim 5 wherein said annular collar is arranged at said flow seat component outlet, wherein said o-ring is adapted to seat against said annular collar.

8. The fluid valve assembly of claim 7 wherein said downstream cup includes a radial ledge defined at a transition between said intermediate portion and said annular collar, said radial ledge supported by said cap component.

9. The fluid valve assembly of claim 1 wherein said cap component is welded to said valve body.

10. The fluid valve assembly of claim 9 wherein said cap component defines a tapered female surface adapted to receive a tapered male surface defined on said valve body and wherein said cap component and said valve body are welded together at an interface between said tapered male and female receiving surfaces.

11. A fluid valve assembly, comprising:
    a valve body defining an inlet, an outlet and a fluid passage communicating fluid therebetween;
    a flow control member positioned within said fluid passage and having a central passage through which said fluid advances;
    a flow seat component positioned in said valve body downstream of said flow control member and receiving said fluid from said flow control member, said flow seat component defining an upstream cup and a downstream cup, said upstream cup supporting said flow control member and said downstream cup having an intermediate portion and an annular collar stepped in from said intermediate portion, said downstream cup including a radial ledge defined at a transition between said intermediate portion and said annular collar;
    a cap component secured to a distal opening defined on said valve body; and
    a quick-connect collet retained within an opening defined on said cap component.

12. The fluid valve assembly of claim 11 wherein said cap component defines a tapered female surface adapted to receive a tapered male surface defined on said valve body and wherein said cap component and said valve body are welded together at an interface between said tapered male and female receiving surfaces.

* * * * *